US009664554B2

(12) United States Patent
Kadosawa et al.

(10) Patent No.: US 9,664,554 B2
(45) Date of Patent: May 30, 2017

(54) VIBRATION DETECTING APPARATUS AND VIBRATION DETECTING METHOD (71) Applicant: NEC Corporation, Tokyo (JP)

(72) Inventors: Hideki Kadosawa, Tokyo (JP); Tetsuya Yoshinari, Tokyo (JP); Shigeki Shinoda, Tokyo (JP); Katsumi Abe, Tokyo (JP); Yasuhiro Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 229 days.

(21) Appl. No.: 14/408,574

(22) PCT Filed: Dec. 11, 2012

(86) PCT No.: PCT/JP2012/082039
§ 371 (c)(1),
(2) Date: Dec. 17, 2014

(87) PCT Pub. No.: WO2013/190727
PCT Pub. Date: Dec. 27, 2013

(65) Prior Publication Data
US 2015/0160071 A1 Jun. 11, 2015

(30) Foreign Application Priority Data
Jun. 18, 2012 (JP) ................................ 2012-137339

(51) Int. Cl.
G01H 11/08 (2006.01)
G08B 13/16 (2006.01)
G01H 11/06 (2006.01)

(52) U.S. Cl.
CPC ............. G01H 11/06 (2013.01); G01H 11/08 (2013.01); G08B 13/1654 (2013.01)

(58) Field of Classification Search
CPC ..... G01H 11/08; G01H 11/06; G08B 13/1654
(Continued)

(56) References Cited

U.S. PATENT DOCUMENTS 4,290,058 A 9/1981 Bystricky
5,510,944 A * 4/1996 Mozar .................... H02H 3/207
361/18
(Continued)

FOREIGN PATENT DOCUMENTS

JP 359148598 * 8/1984
JP 2000-009526 1/2000
(Continued)

OTHER PUBLICATIONS

International Search Report PCT/JP2012/082039 dated Mar. 5, 2013.
(Continued)

Primary Examiner — J M Saint Surin
(74) Attorney, Agent, or Firm — Young & Thompson (57) ABSTRACT Provided are a vibration detector and a vibration detecting method, which are power saving, can detect vibration even if the vibration is very weak, and can perform both start-up of the apparatus and collection of data of vibration information by the use of only one sensor. The apparatus includes a vibration detector, a semiconductor switch, a controller and a power supply. The semiconductor switch and the controller are connected to the power supply. The vibration detector detects vibration and consequently generates a vibration voltage. The semiconductor switch includes a voltage divider for generating a bias voltage inside. The semiconductor switch detects a voltage produced by superposing the bias voltage onto the vibration voltage outputted from the vibration detector, and conducts current when the detected voltage is equal to or larger than a certain value. The controller wakes up with the current conducted by the semiconductor switch as a trigger signal.

15 Claims, 10 Drawing Sheets (58) Field of Classification Search
USPC .......................................................... 73/658
See application file for complete search history.

(56) References Cited

U.S. PATENT DOCUMENTS

| | | | | |
|---|---|---|---|---|
| 5,621,627 | A * | 4/1997 | Krawchuk | ............ H02M 5/458 |
| | | | | 363/37 |
| 6,801,247 | B1 * | 10/2004 | Ohishi | ............... H04N 5/23248 |
| | | | | 348/208.1 |
| 7,430,914 | B2 * | 10/2008 | Mitchell | ................. G01M 7/08 |
| | | | | 73/579 |
| 2002/0175808 | A1 * | 11/2002 | Okada | ..................... B06B 1/023 |
| | | | | 340/407.1 |
| 2006/0277995 | A1 * | 12/2006 | Kutsuna | ................. G01C 19/56 |
| | | | | 73/504.02 |
| 2008/0041161 | A1 | 2/2008 | Glesius | |
| 2012/0318056 | A1 * | 12/2012 | Izumi | .................... G01L 9/0008 |
| | | | | 73/146.3 |

FOREIGN PATENT DOCUMENTS

| | | | |
|---|---|---|---|
| JP | 2003-346107 | | 12/2003 |
| JP | 2006-126095 | | 5/2006 |
| JP | 3911854 | * | 9/2007 |
| JP | 2008-046123 | | 2/2008 |
| JP | 2008-186336 | | 8/2008 |
| JP | 2009-273201 | | 11/2009 |

OTHER PUBLICATIONS

Extended European Search Report dated Sep. 28, 2015; Application No. 12879337.9.

* cited by examiner

VIBRATION DETECTING APPARATUS AND VIBRATION DETECTING METHOD

TECHNICAL FIELD

The present invention relates to a vibration detecting apparatus and a vibration detecting method.

BACKGROUND ART

In recent years, it has been proposed to install sensor devices at a variety of indoor and outdoor places, thereby to monitor temperature, humidity, brightness and human movement, and to perform control of lighting and air conditioning on the basis of thus obtained data, and it has already become in practical use in some places. It also has been proposed to perform communication between the sensor devices and a master device, by sending and receiving the obtained data, and then to perform the above-described control in the master device. However, when dealing with events to occur temporally irregularly, sensors (event detection sensors) and transmission/reception means are required to be always in an activated state, and accordingly, power consumption of the event detection sensors and of the sending/reception means have been a problem. In this respect, there has been proposed a sensor system in which a semiconductor switch is started up by a signal of a vibration sensor using the signal as a trigger signal, and the start-up of the semiconductor switch causes a transmission/reception circuit to start up (for example, Patent Literature 1 (PTL1) is referred to). With the technology of Patent Literature 1, power consumption is reduced compared to the case of being always in an activated state, as a result of that both the semiconductor switch and the transmission/reception circuit are in a standby state when no vibration is detected. There also has been proposed a piezoelectric-type vibration sensor in which the vibration sensor is used as a trigger signal means, and thereby a power switch is turned on and off by a vibration at a time of starting operation of the mechanical apparatus (for example, Patent Literature 2 (PTL2) is referred to). In the technology of Patent Literature 2, the vibration sensor is composed of a piezoelectric ceramic plate, a rigid ball and a supporting member on which the rigid ball rolls, and a voltage generated by the rigid ball striking the piezoelectric ceramic plate is used as a detection signal.

CITATION LIST

Patent Literature

[PTL 1]
Japanese Patent Application Laid-Open No. 2003-346107
[PTL 2]
Japanese Patent Application Laid-Open No. 2008-186336

SUMMARY OF INVENTION

Technical Problem

However, in the technology of Patent Literature 1, reduction of power consumption cannot be said to be sufficient because electric power is always supplied to a trigger circuit including the vibration sensor, and detection of very weak vibration is difficult. In the technology of Patent Literature 2, capturing a very weak vibration is difficult, and accordingly, when it is necessary to measure a state of the mechanical apparatus, another sensor for measuring the mechanical apparatus state is required in addition to the piezoelectric vibration sensor.

The objective of the present invention is to provide a vibration detecting apparatus and a vibration detecting method which are power saving, can detect a vibration even if the vibration is very weak, and can perform start-up of the apparatus and collection of data of vibration information by the use of only one sensor.

Solution to Problem

In order to achieve the objective described above, a vibration detecting apparatus of the present invention comprises
a vibration detecting means, a semiconductor switch, a control means and a power supply means, wherein:
the semiconductor switch and the control means are connected with the power supply means;
the vibration detecting means detects vibration and generates a vibration voltage;
the semiconductor switch comprises a voltage dividing means for generating a bias voltage inside;
the semiconductor switch is a switch which detects a voltage consisting of the vibration voltage outputted by the vibration detecting means and of the bias voltage superposed on the vibration voltage, and conducts current when the detected voltage is equal to or larger than a certain value; and
the control means wakes up with the current conducted by the semiconductor switch as a trigger signal.

A vibration detecting method of the present invention comprises: a voltage generation process of generating a voltage as a result of detecting a vibration;
a bias voltage superposing process of superposing a bias voltage onto the voltage generated by the voltage generation process;
a trigger signal transmission process of transmitting a trigger signal when the voltage produced by the superposition of the bias voltage by the bias voltage superposing process is equal to or larger than a certain value; and
a vibration detection determination process of determining presence or absence of a detected vibration in response to the trigger signal transmitted by the trigger signal transmission process.

Advantageous Effect of Invention

According to the vibration detecting apparatus and the vibration detecting method of the present invention, it is possible to achieve power saving, to detect even a very weak vibration, and to perform both start-up of the apparatus and collection of data of vibration information by the use of only one sensor.

DESCRIPTION OF EMBODIMENTS

Hereinafter, a vibration detecting apparatus and a vibration detecting method of the present invention will be described in detail, citing examples and referring to drawings. However, the present invention is not limited to the examples, which will be shown below. In FIGS. 1 to 10 shown below, the same reference sign will be given to the same constituent element. Also in the drawings, for the convenience of description, the structure of each constituent element may be illustrated in a properly simplified manner, and the size ratio or the like of each constituent element may be schematically illustrated in a manner different from the actual one.

Exemplary Embodiment 1

Figure 1:
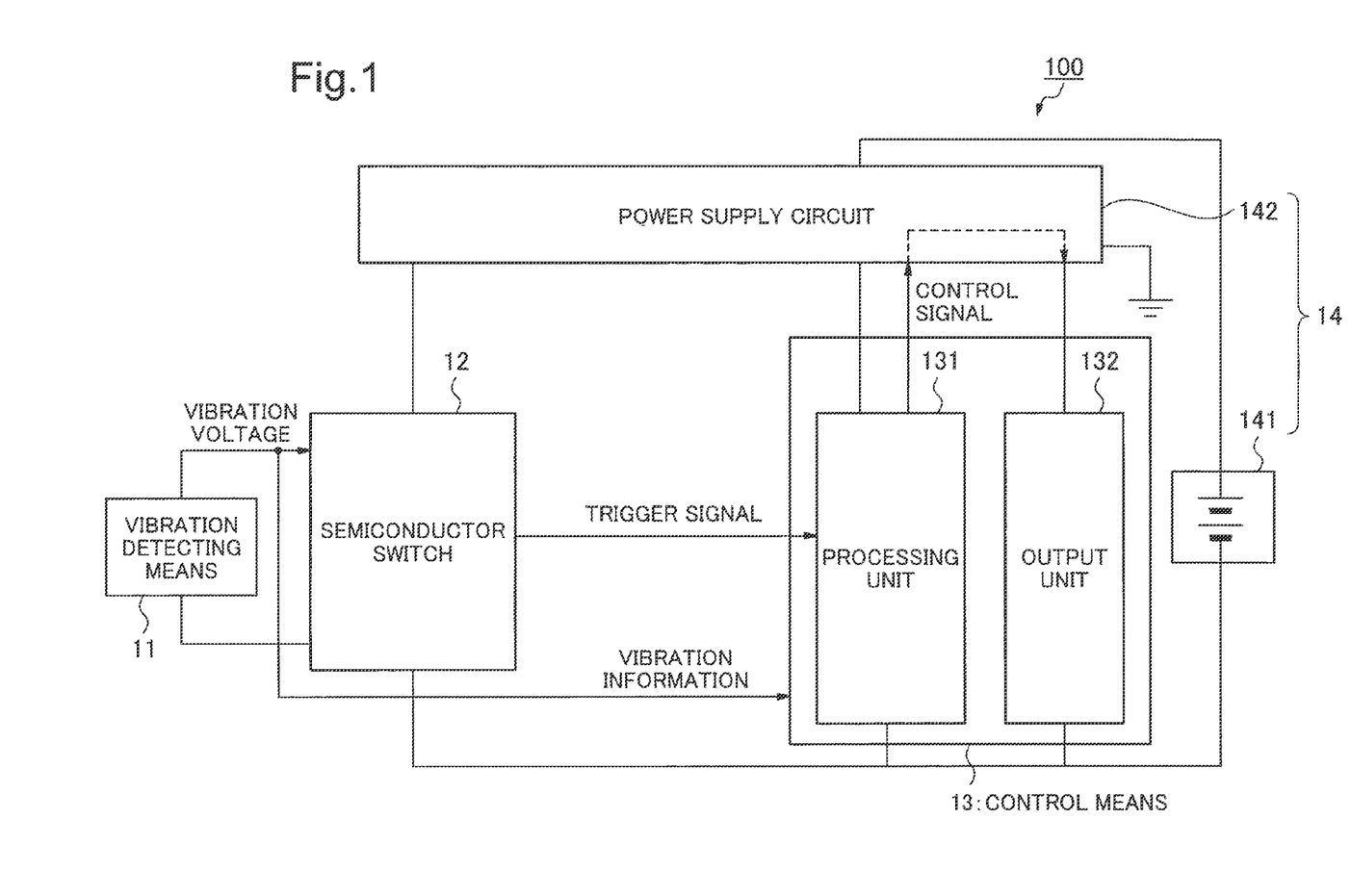
FIG. 1 is a schematic configuration diagram of an example (exemplary embodiment 1) of a vibration detecting apparatus of the present invention.

A schematic configuration diagram of a vibration detecting apparatus of an exemplary embodiment 1 is shown in FIG. 1. As shown in FIG. 1, the vibration detecting apparatus 100 of the present exemplary embodiment comprises, as primary constituent elements, a vibration detecting means 11, a semiconductor switch 12, a control means 13 and a power supply means 14. The semiconductor switch 12 and the control means 13 are connected with the power supply means 14. The vibration detecting means 11 is connected with the semiconductor switch 12. The semiconductor switch 12 is connected with the control means 13. In the configuration shown in FIG. 1, the power supply means 14 is composed of a power supply 141 and a power supply circuit 142, and the control means 13 is composed of a processing unit 131 and an output unit 132 (transmission/reception unit).

The vibration detecting means 11 is a vibration sensor, for example, which detects vibration of a structure, acquires vibration waveform data from the structure and then converts the data into a vibration voltage. The vibration voltage is transmitted to the semiconductor switch 12. There is no particular restriction on the vibration sensor, and publicly known vibration sensors may be used. Specifically, an acceleration sensor, a velocity sensor, a displacement sensor and the like are mentioned, for example. The acceleration sensor is preferably a piezoelectric-type one with a built-in signal amplifier circuit. The vibration detecting means 11 (vibration sensor) is preferably one with high sensitivity and capability of detecting signals in a wide frequency band. As the vibration detecting means 11, a contact type vibration detecting means to be installed in a structure may be used, for example. There is no particular restriction on a location for the installation in a structure, and the vibration detecting means 11 may be installed at an appropriate location in the structure in accordance with the use of the vibration detecting apparatus 100.

Figure 2:
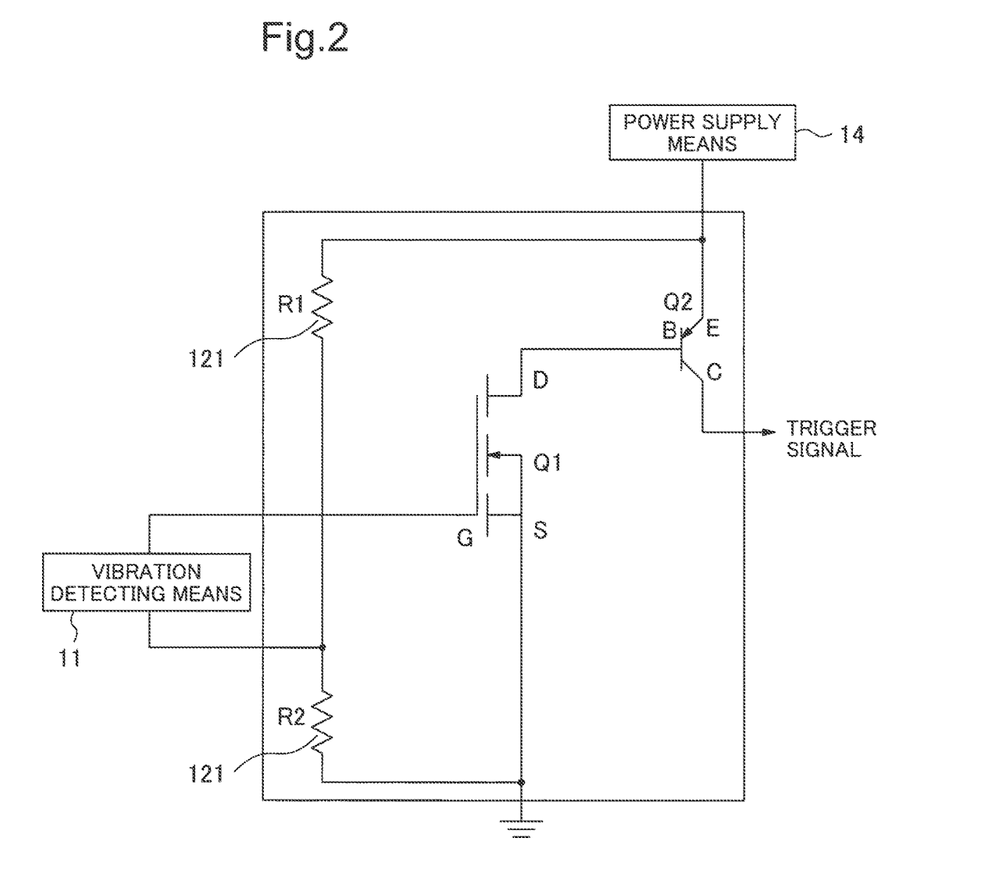
FIG. 2 is a schematic diagram of an example of a structure of a semiconductor switch in the exemplary embodiment 1.

A structure of the semiconductor switch 12 in the present exemplary embodiment is shown in FIG. 2. In FIG. 2, the semiconductor switch 12 is illustrated including a state of its connection with the vibration detecting means 11. In the present invention, the semiconductor switch 12 is a switch which comprises a voltage dividing means for generating a bias voltage inside, detects a voltage consisting of a vibration voltage outputted by the vibration detecting means 11 and of the bias voltage superposed onto the vibration voltage, and conducts current when the detected voltage is equal to or larger than a certain value. The semiconductor switch 12 converts the vibration voltage into a binary trigger signal according to the magnitude of the voltage value, and transmits the signal to the control means 13. Although voltage dividing resistors R1 and R2 are used as a voltage dividing means 121 in FIG. 2, the present invention is not limited to that, and voltage dividing capacitors, converters or the like, for example, may also be used as the voltage dividing means 121. When voltage dividing resistors are used as the voltage dividing means 121, there occurs power consumption but no voltage fluctuation. When voltage dividing capacitors are used, power consumption is small but voltage fluctuation is easily generated. What kind of means is used as the voltage dividing means 121 may be determined according to the use of the vibration detecting apparatus. The semiconductor switch 12 is a switch comprising a semiconductor element, and the semiconductor switch 12 has a function to detect the above-described voltage and to conduct current when the voltage is equal to or larger than a certain value. The semiconductor element is, for example, a transistor, a field effect transistor (FET) or the like. When the semiconductor switch is an FET, for example, the above-described voltage is detected as the gate voltage, and a drain current flows when the voltage is equal to or larger than a certain value.

In FIG. 2, the semiconductor switch 12 comprises a channel FET (N-type channel MOSFET (Q1)) and a bipolar transistor (PNP transistor (Q2)). The above-described voltage dividing resistors includes a first and a second resistors (R1 and R2), and R1 and R2 each have a first and a second terminals. The vibration detecting means 11 also has a first and a second terminals. Then, the first terminal of R1 is electrically connected to the power supply means 14, the second terminal of R1 is electrically connected to the first terminal of R2 and to the second terminal of the vibration detecting means 11, and the second terminal of R2 is grounded. Further, the first terminal of the vibration detecting means 11 is electrically connected to the gate of the channel FET, the source of the channel FET is grounded, the drain of the channel FET is electrically connected to the base of the bipolar transistor, the emitter of the bipolar transistor is electrically connected to the power supply means 14, and the collector of the bipolar transistor is electrically connected to the control means 13.

Figure 3:
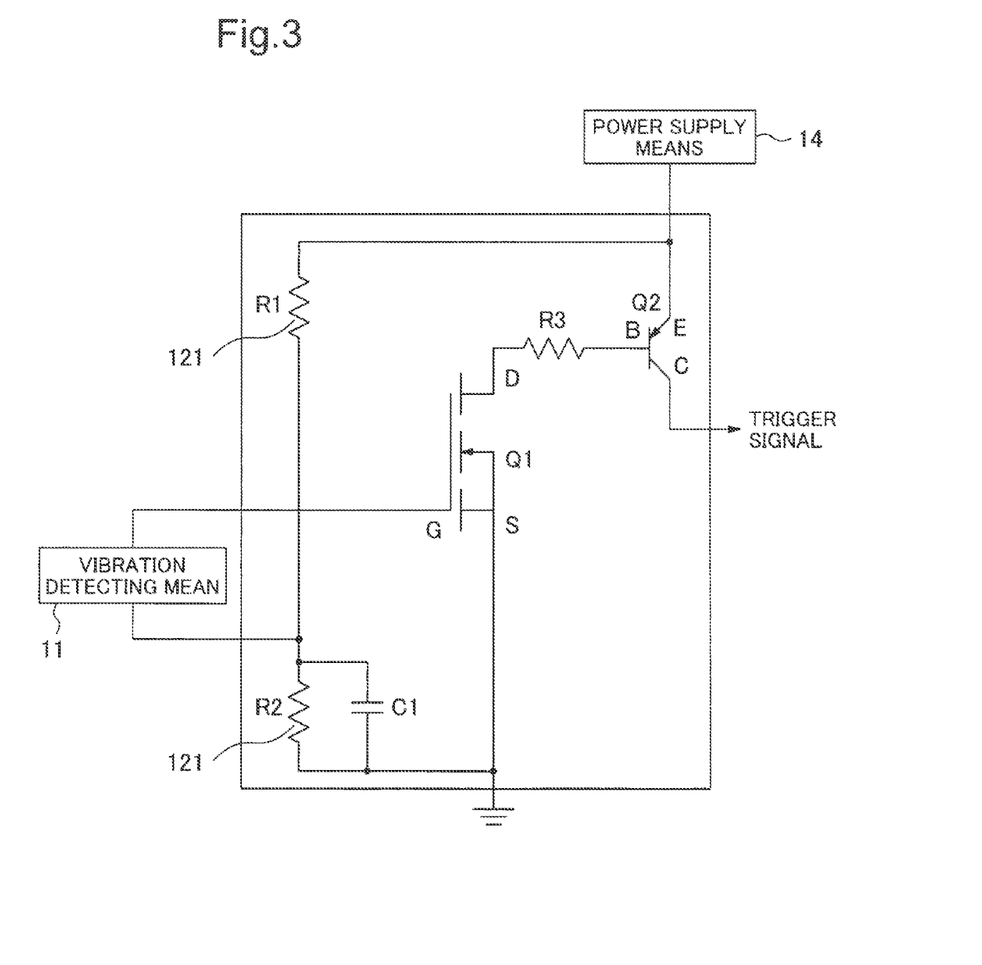
FIG. 3 is a schematic diagram of another example of a structure of a semiconductor switch in the exemplary embodiment 1.
Figure 4:
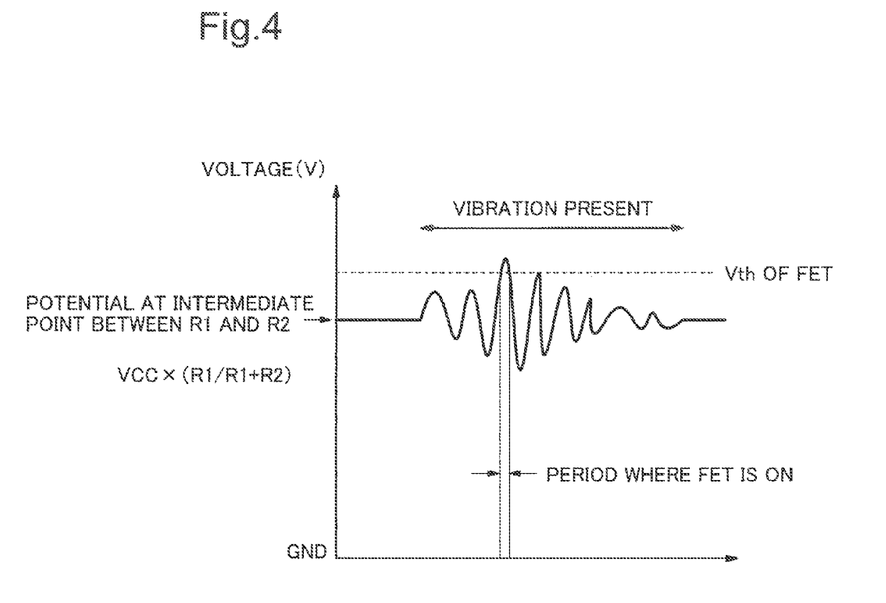
FIG. 4 is a waveform of a gate voltage of an N-type channel MOSFET (Q1) in the exemplary embodiment 1.

That is, one electrode of the vibration detecting means 11 is connected to an intermediate point between the voltage dividing resistors R1 and R2 of the semiconductor switch 12, and the other electrode is connected to the gate G of the N-type channel MOSFET (Q1). The drain D of the N-type channel MOSFET (Q1) is connected to the base B of the PNP transistor (Q2). Here, the drain D of the N-type channel MOSFET (Q1) may be connected to the base B of the PNP transistor (Q2) via a limiting resistor R3, as shown in FIG. 3. The emitter E of the PNP transistor (Q2) is connected to the power supply means 14, and the collector C is made an output port for a trigger signal. Here, when there is no vibration, the voltage difference between the two electrodes of the vibration detecting means 11 is zero, and accordingly, the potential at the intermediate point between the voltage dividing resistors R1 and R2 of the semiconductor switch 12 is the same as that at the gate G of the N-type channel MOSFET (Q1). Resistance values of the voltage dividing resistors R1 and R2 are set such that the potential at the intermediate point between R1 and R2 becomes slightly lower than the threshold voltage Vth of the N-type channel MOSFET (Q1). When there is no vibration, both of the N-type channel MOSFET (Q1) and the PNP transistor (Q2) are kept OFF. When there is a vibration, the vibration detecting means 11 generates a vibration voltage in accordance with the acceleration. If the voltage between the gate G and the source S of the N-type channel MOSFET (Q1) exceeds the specific threshold voltage Vth, the N-type channel MOSFET (Q1) becomes ON. In FIG. 4, shown is a waveform of the gate voltage of the N-type channel MOSFET (Q1) for when the N-type channel MOSFET (Q1) changes its state as OFF→ON→OFF. Although the maximum amplitude of the vibration voltage is generally smaller than the threshold voltage Vth of the N-type channel MOSFET (Q1), the N-type channel MOSFET (Q1) can enter into the ON state in the present case, because the voltage between the gate G and the source S is biased in advance by the voltage dividing resistors R1 and R2 of the semiconductor switch 12. Here, because a voltage is always applied between the both ends of the voltage dividing resistors R1 and R2 by the power supply means 14, it is preferable, for the purpose of achieving low power consumption, to set resistance values of the voltage dividing resistors R1 and R2 as large as possible within a range not causing false operation. For example, in order to suppress the consumption current into a microampere range, resistance values of the voltage dividing resistors R1 and R2 are preferably set to be equal to or larger than a few hundred kilo-ohms. Here, in FIG. 2, while the PNP transistor (Q2) is an optional constituent member, it is preferably included because, if it is included, a signal amplified by the PNP transistor (Q2) can be outputted even when a voltage change at the gate G of the N-type channel MOSFET (Q1) is small, that is, even when the vibration detecting means 11 has a characteristic of outputting only a weak signal. As shown in FIG. 3, a smoothing capacitor C1 may be disposed in order to prevent pulsating current due to fluctuation of the power supply voltage and false operation due to noise. The smoothing capacitor C1 (voltage dividing capacitor), which has a first and a second terminals, may be disposed with the first terminal being electrically connected to the first terminal of the second resistor R2, and with the second terminal being grounded.

The control means 13 wakes up with the current conducted by the semiconductor switch 12 as a trigger signal. The control means 13 having waked up starts processing. The processing unit 131 of the control means 13 is a means for processing and detecting an output signal outputted from the vibration detecting means 11, which is a microcomputer or the like, for example. In FIG. 2, when the trigger signal is transmitted from the semiconductor switch 12 to the control means 13, the processing unit 131 switches from a standby state being a power saving mode to a wake-up state. At the same time as its waking up, the processing unit 131 transmits a control signal to the power supply circuit 142. In response to the control signal, the power supply circuit 142 supplies power to the output unit 132. The vibration voltage is transmitted to the processing unit 131 as vibration information. In the processing unit 131, for example, filtering with a frequency based on a sampling frequency and subsequent computational processing into a digital signal are performed on the vibration information, and the resultant signal is transmitted to the output unit 132. The output unit 132 of the control means 13 sends the digital signal after modulating it into a signal waveform able to be sent. The output unit 132 may comprise an antenna, and the output signal may be sent in the form of a radio signal. Analysis of the vibration information may be performed by the processing unit 131 or the output unit 132, or by another analysis means to which the vibration information is sent from the output unit 132. After performing computational processing on vibration information for a certain period of time, the processing unit 131 switches again to the standby state being a power saving mode and prepares for the next vibration. In the above description, the embodiment has been shown to be the one in which the vibration voltage is transmitted to the processing unit 131 as vibration information and is processed there, but the present invention is not limited to that, and the trigger signal itself may be used as vibration information, for example.

As described above, the vibration detecting apparatus of the present exemplary embodiment 1 can detect a weak signal, while being power saving, because a bias voltage is superposed onto the vibration voltage by the voltage dividing means. Further, the vibration detecting apparatus can perform start-up of the apparatus and collection of vibration information (data) by the use of only one vibration detecting means.

Figure 5:
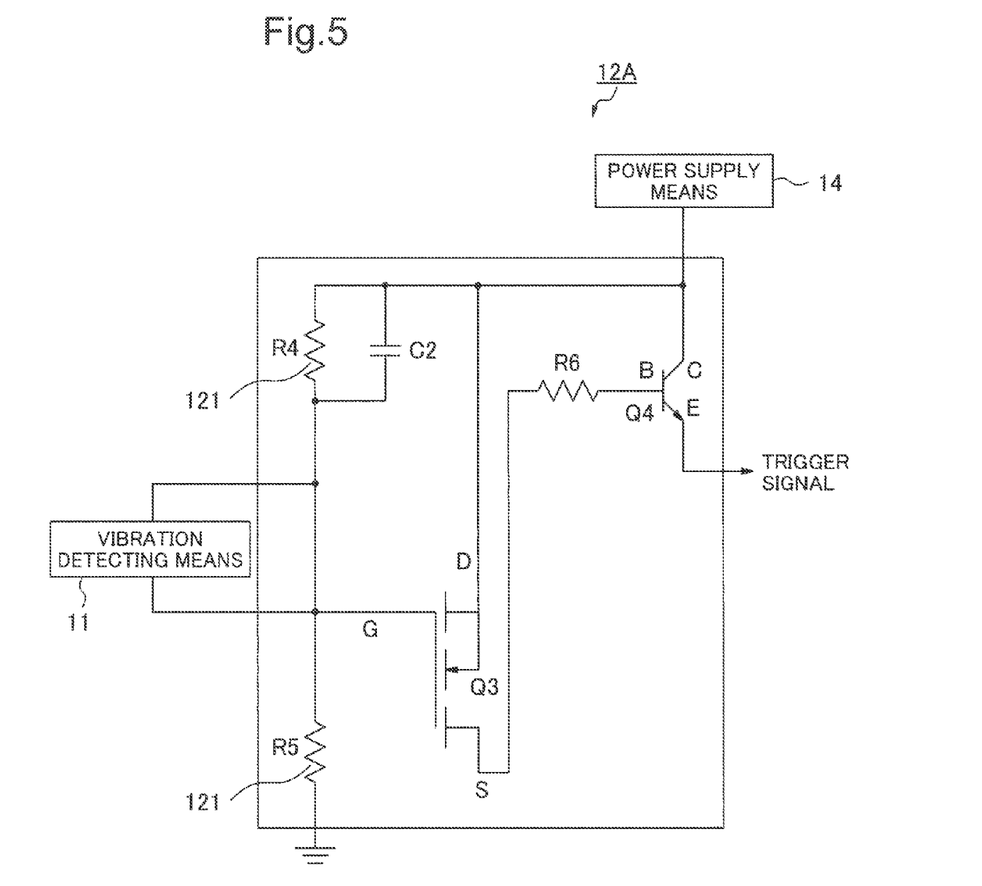
FIG. 5 is a schematic diagram of an example of a structure of a semiconductor switch in a modified example of the exemplary embodiment 1.

A structure of a semiconductor switch 12A in a modified example of the present exemplary embodiment 1 is shown in FIG. 5. In FIG. 5, the semiconductor switch 12A is illustrated including a state of its connection with the vibration detecting means 11. In FIG. 5, the semiconductor switch 12A comprises a channel FET (P-type channel MOSFET (Q3)) and a bipolar transistor (NPN transistor (Q4)). Voltage dividing resistors include a first and a second resistors (R4 and R5), and R4 and R5 each have a first and a second terminals. The vibration detecting means 11 also has a first and a second terminals. Then, the first terminal of R4 is electrically connected to the power supply means 14, the second terminal of R4 is electrically connected to the first terminal of R5 and to the first terminal of the vibration detecting means 11, and the second terminal of R5 is grounded. Further, the second terminal of the vibration detecting means 11 is electrically connected to the gate of the channel FET, the drain of the channel FET is electrically connected to the power supply means 14, the source of the channel FET is electrically connected to the base of the bipolar transistor, the emitter of the bipolar transistor is electrically connected to the control means 13, and the collector of the bipolar transistor is electrically connected to the power supply means 14.

Figure 6:
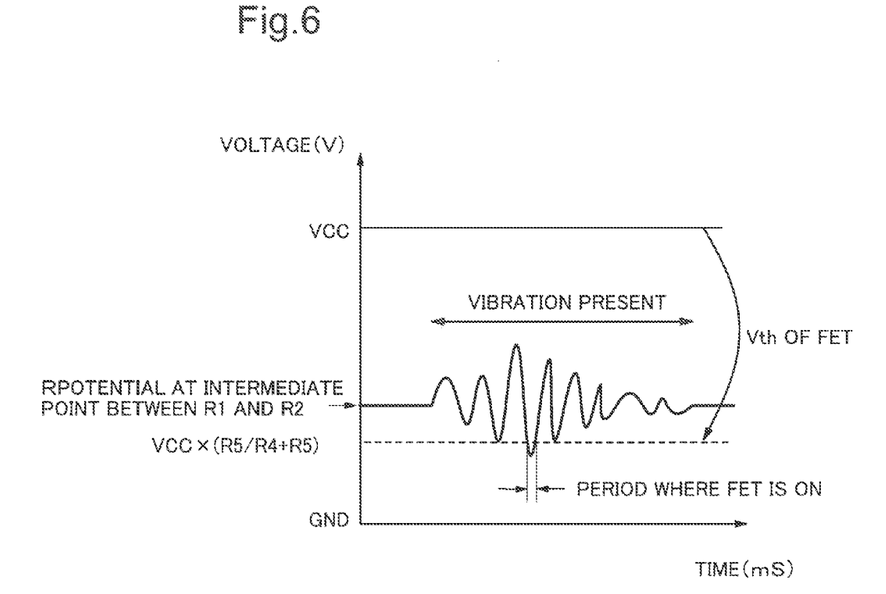
FIG. 6 is a waveform of a gate voltage of a P-type channel MOSFET (Q3) in the modified example of the exemplary embodiment 1.

That is, one electrode of the vibration detecting means 11 is connected to an intermediate point between the voltage dividing resistors R4 and R5 of the semiconductor switch 12A, and the other electrode is connected to the gate G of the P-type channel MOSFET (Q3). The source S of the P-type channel MOSFET (Q3) is connected to the base B of the NPN transistor (Q4) via a limiting resistor R6. The collector C of the NPN transistor (Q4) is connected to the power supply means 14, and the emitter E is made an output port for a trigger signal. Here, when there is no vibration, the voltage difference between the two electrodes of the vibration detecting means 11 is zero, and accordingly, the potential at the intermediate point between the voltage dividing resistors R4 and R5 of the semiconductor switch 12A is the same as that at the gate G of the P-type channel MOSFET (Q3). Resistance values of the voltage dividing resistors R4 and R5 are set such that the potential at the intermediate point between R4 and R5 becomes slightly lower than the threshold voltage Vth of the P-type channel MOSFET (Q3). When there is no vibration, both of the P-type channel MOSFET (Q3) and the NPN transistor (Q4) are kept OFF. When there is a vibration, the vibration detecting means 11 generates a vibration voltage in accordance with the acceleration. When the voltage between the gate G and the source S of the P-type channel MOSFET (Q3) exceeds the specific threshold voltage Vth, the P-type channel MOSFET (Q3) becomes ON. In FIG. 6, shown is a waveform of the gate voltage of the P-type channel MOSFET (Q3) for when the P-type channel MOSFET (Q3) changes its state as OFF→ON→OFF. Although the maximum amplitude of the vibration voltage is generally smaller than the threshold voltage Vth of the P-type channel MOSFET (Q3), the P-type channel MOSFET (Q3) can enter into the ON state in the present case, because the voltage between the gate G and the source S is biased in advance by the voltage dividing resistors R4 and R5 of the semiconductor switch 12A. Here, because a voltage is always applied between the both ends of the voltage dividing resistors R4 and R5 by the power supply means 14, it is preferable, for the purpose of achieving low power consumption, to set resistance values of the voltage dividing resistors R4 and R5 as large as possible within a range not causing false operation. For example, in order to suppress the consumption current into a microampere range, resistance values of the voltage dividing resistors R4 and R5 are preferably set to be equal to or larger than a few hundred kilo-ohms. Here, in FIG. 5, while the NPN transistor (Q4) is an optional constituent member, it is preferably included because, if it is included, a signal amplified by the NPN transistor (Q4) can be outputted even when a voltage change at the gate G of the P-type channel MOSFET (Q3) is small, that is, even when the vibration detecting means 11 has a characteristic of outputting only a weak signal.

As shown in FIG. 5, a smoothing capacitor C2 may be disposed in order to prevent pulsating current due to fluctuation of the power supply voltage and false operation due to noise. The smoothing capacitor C2 (voltage dividing capacitor), which has a first and a second terminals, may be disposed with the first terminal being electrically connected to the power supply unit 14, and with the second terminal being electrically connected to the second terminal of the first resistor R4. Although the semiconductor switch 12A comprises the smoothing capacitor C2 in FIG. 5, the present invention is not limited to that, and the semiconductor switch 12A does not necessarily need to comprise the smoothing capacitor C2. Further, voltage dividing capacitors may be used in place of the voltage dividing resistors R4 and R5, for the purpose of dividing the supply voltage.

Exemplary Embodiment 2

In the present exemplary embodiment, a semiconductor switch comprises a voltage doubling circuit. Except for that point, a vibration detecting apparatus and a vibration detection method of the present exemplary embodiment are the same as those of the exemplary embodiment 1.

Figure 7:
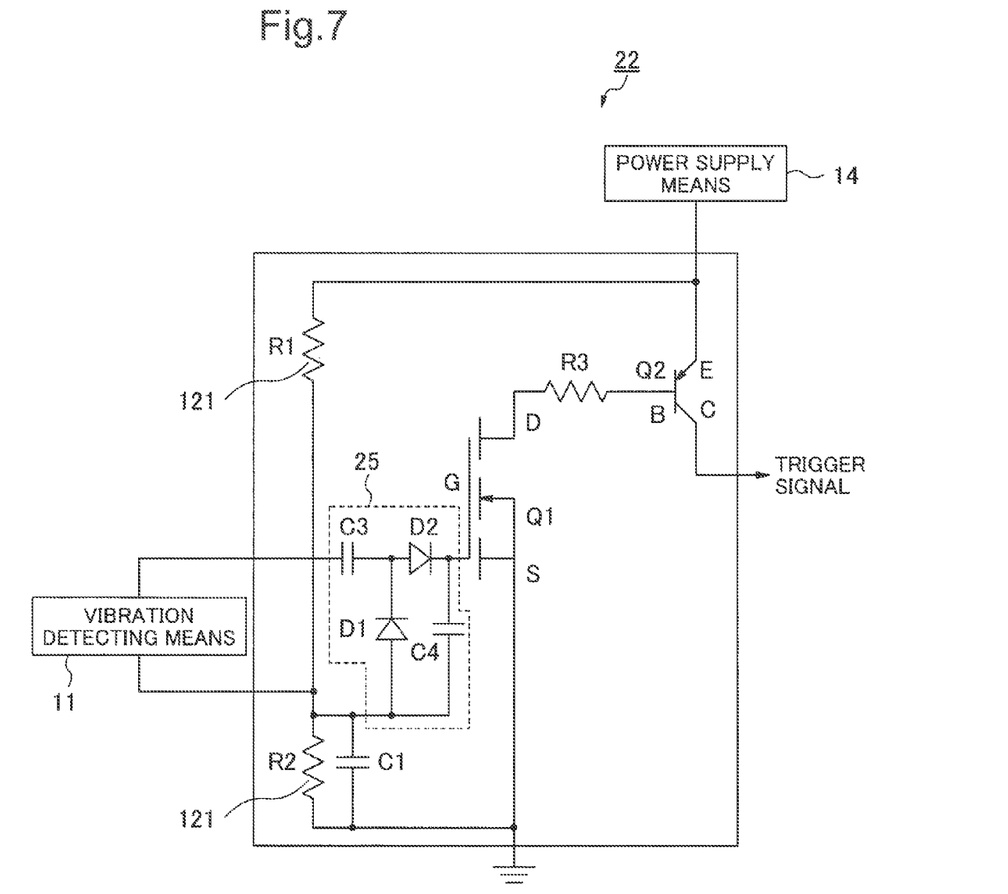
FIG. 7 is a schematic diagram of an example of a structure of a semiconductor switch in an exemplary embodiment 2.

A structure of a semiconductor switch 22 in the present exemplary embodiment is shown in FIG. 7. The semiconductor switch 22 is the same as the semiconductor switch 12 in FIG. 3, except that a half-wave voltage doubler rectifying circuit (voltage doubling circuit) 25 composed of capacitors C3 and C4 and of diodes D1 and D2 is added between the vibration detecting means 11 and the N-type channel MOSFET (Q1). As a result of doubling the vibration voltage by the use of the voltage doubling circuit 25, a trigger signal can be transmitted from the semiconductor switch 22 even when the vibration voltage is further small.

Figure 8:
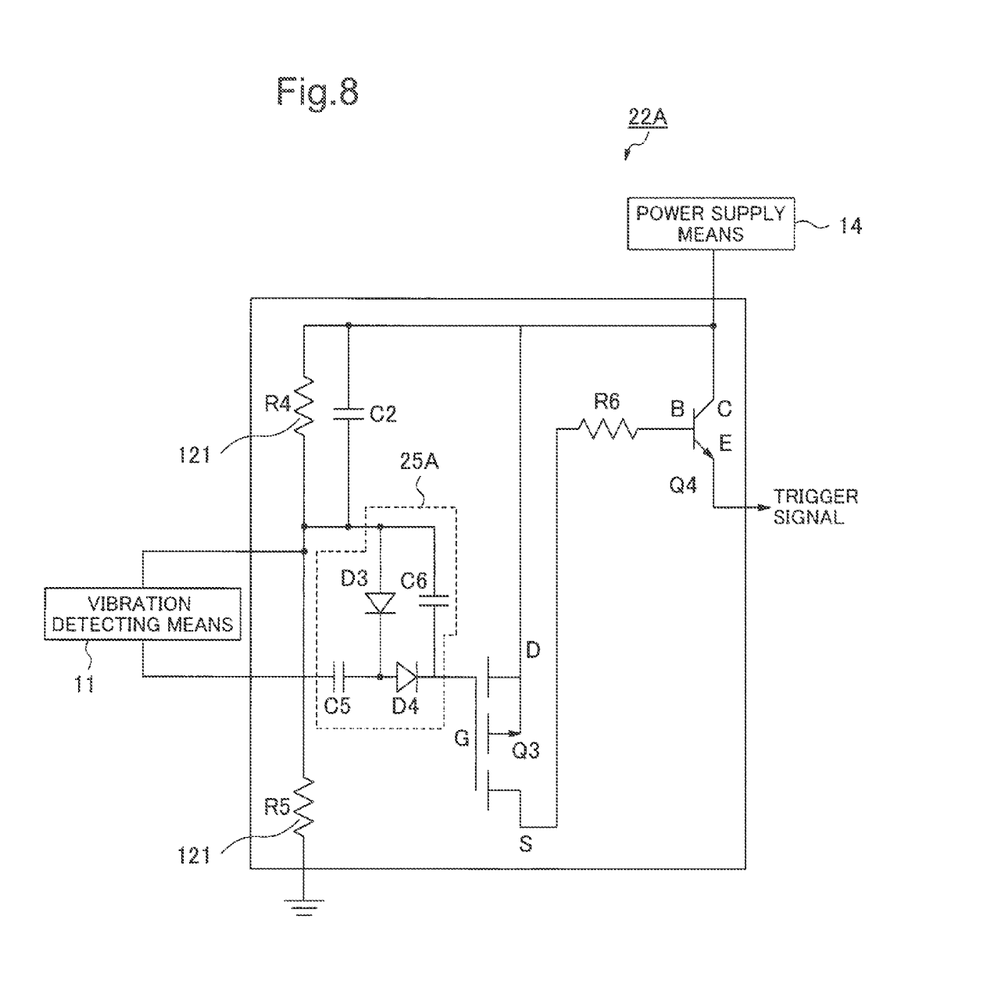
FIG. 8 is a schematic diagram of an example of a structure of a semiconductor switch in a modified example of the exemplary embodiment 2.

A structure of a semiconductor switch 22A in a modified example of the present exemplary embodiment 2 is shown in FIG. 8. In FIG. 8, the semiconductor switch 22A is the same as the semiconductor switch 12A in FIG. 5, except that a half-wave voltage doubler rectifying circuit (voltage doubling circuit) 25A composed of capacitors C5 and C6 and of diodes D3 and D4 is added between the vibration detecting means 11 and the P-type channel MOSFET (Q3). As a result of doubling the vibration voltage by the use of the voltage doubling circuit 25A, a trigger signal can be transmitted from the semiconductor switch 22A even when the vibration voltage is further small.

As has been described above, in the vibration detecting apparatus of the present exemplary embodiment 2, a trigger signal can be transmitted from the semiconductor switch even when the vibration voltage is further small, because the semiconductor switch comprises the voltage doubling circuit and can accordingly double the vibration voltage by the use of the voltage doubling circuit.

Exemplary Embodiment 3

In the present exemplary embodiment, a vibration detecting apparatus further comprises a voltage amplification means. Except for that point, the vibration detecting apparatus and a vibration detection method of the present exemplary embodiment are the same as those of the exemplary embodiment 1.

Figure 9:
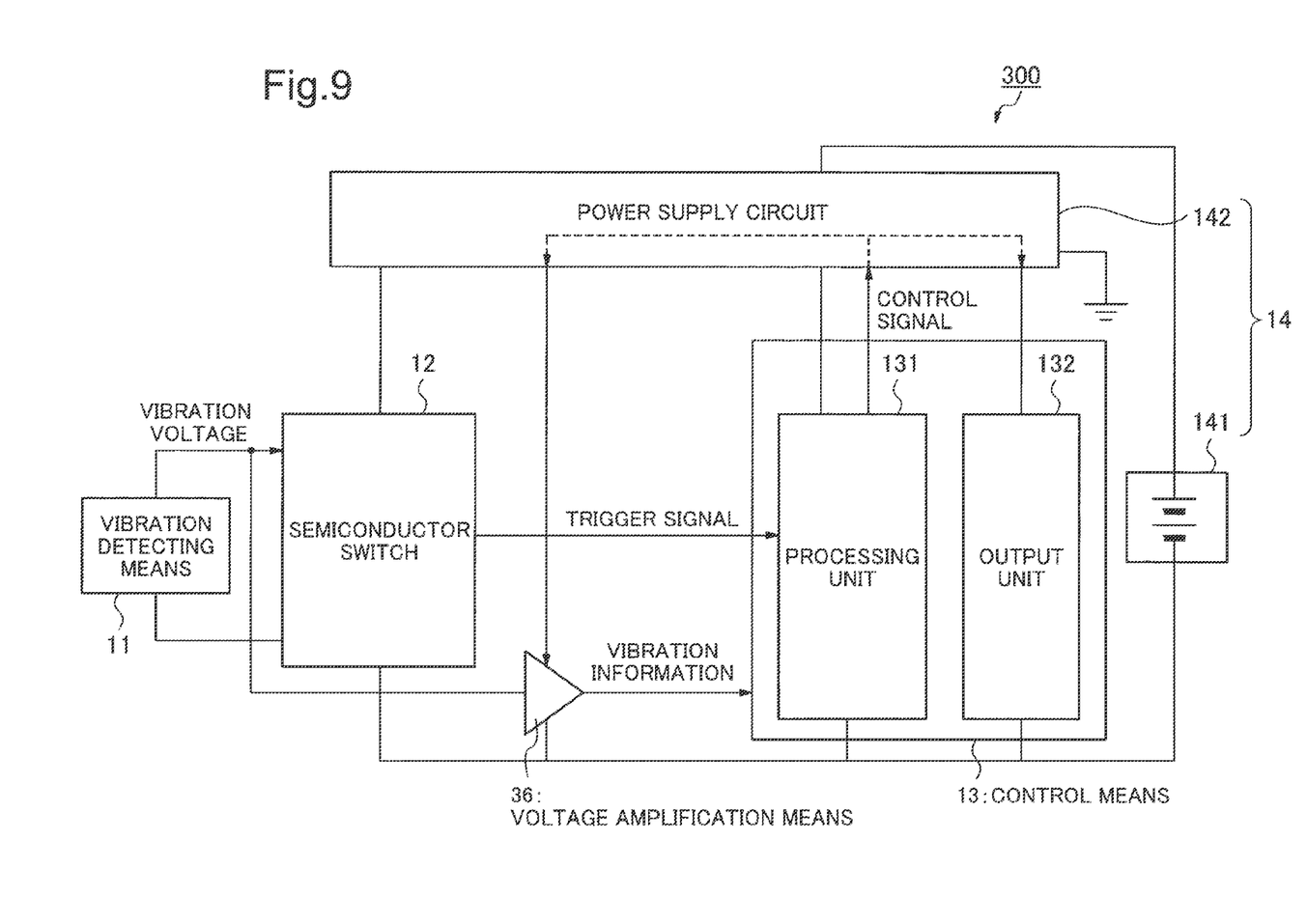
FIG. 9 is a schematic configuration diagram of an example of a vibration detecting apparatus of an exemplary embodiment 3.

A schematic configuration diagram of the vibration detecting apparatus of the exemplary embodiment 3 is shown in FIG. 9. The vibration detecting apparatus 300 of the present exemplary embodiment is the same as the vibration detecting apparatus 100 in FIG. 1, except that the semiconductor switch 12 and a voltage amplification means 36 are connected to the vibration detecting means 11 and to the control means 13 via signal lines. In FIG. 9, when a trigger signal is transmitted from the semiconductor switch 12 to the control means 13, the processing unit 131 switches from a standby state being a power saving mode to a wake-up state. At the same time as its waking up, the processing unit 131 transmits a control signal to the power supply circuit 142. In response to the control signal, the power supply circuit 142 supplies power to the voltage amplification means 36 and the output unit 132. A vibration voltage is transmitted to the voltage amplification means 36. The vibration voltage is amplified by the voltage amplification means 36 and then transmitted to the processing unit 131 as vibration information. In this way, the vibration voltage can be made to be analyzable level of vibration information by means of the voltage amplification means 36.

As has been described above, the vibration detecting apparatus of the present exemplary embodiment 3 can obtain vibration information of analyzable level even when the vibration voltage is further small, because it further comprises the voltage amplification means.

In the present exemplary embodiment 3, a piezoelectric sensor may be used as the vibration detecting means 11. The piezoelectric sensor is made of a piezoelectric ceramic. Because the piezoelectric sensor itself works also as a power generation source, an external power supply becomes unnecessary, and further power saving is accordingly achieved. Further, because using the piezoelectric sensor as the vibration detecting means makes it possible to fabricate the vibration detecting means into a relatively simple structure with an unrestricted shape, the vibration detecting apparatus can be reduced in size.

In the present exemplary embodiment 3, also a semiconductor-type sensor may be used as the vibration detecting means 11. When the semiconductor-type sensor is used, acceleration can be measured even when the acceleration does not change in a manner like that of alternating current, because a voltage proportional to the magnitude of the acceleration is outputted as a result of a change in capacitance in the silicon chip.

Exemplary Embodiment 4

In the present exemplary embodiment, a vibration detecting apparatus further comprises a charge-voltage conversion means (charge amplifier). Except for that point, the vibration detecting apparatus and a vibration detection method of the present exemplary embodiment are the same as those of the exemplary embodiment 3.

Figure 10:
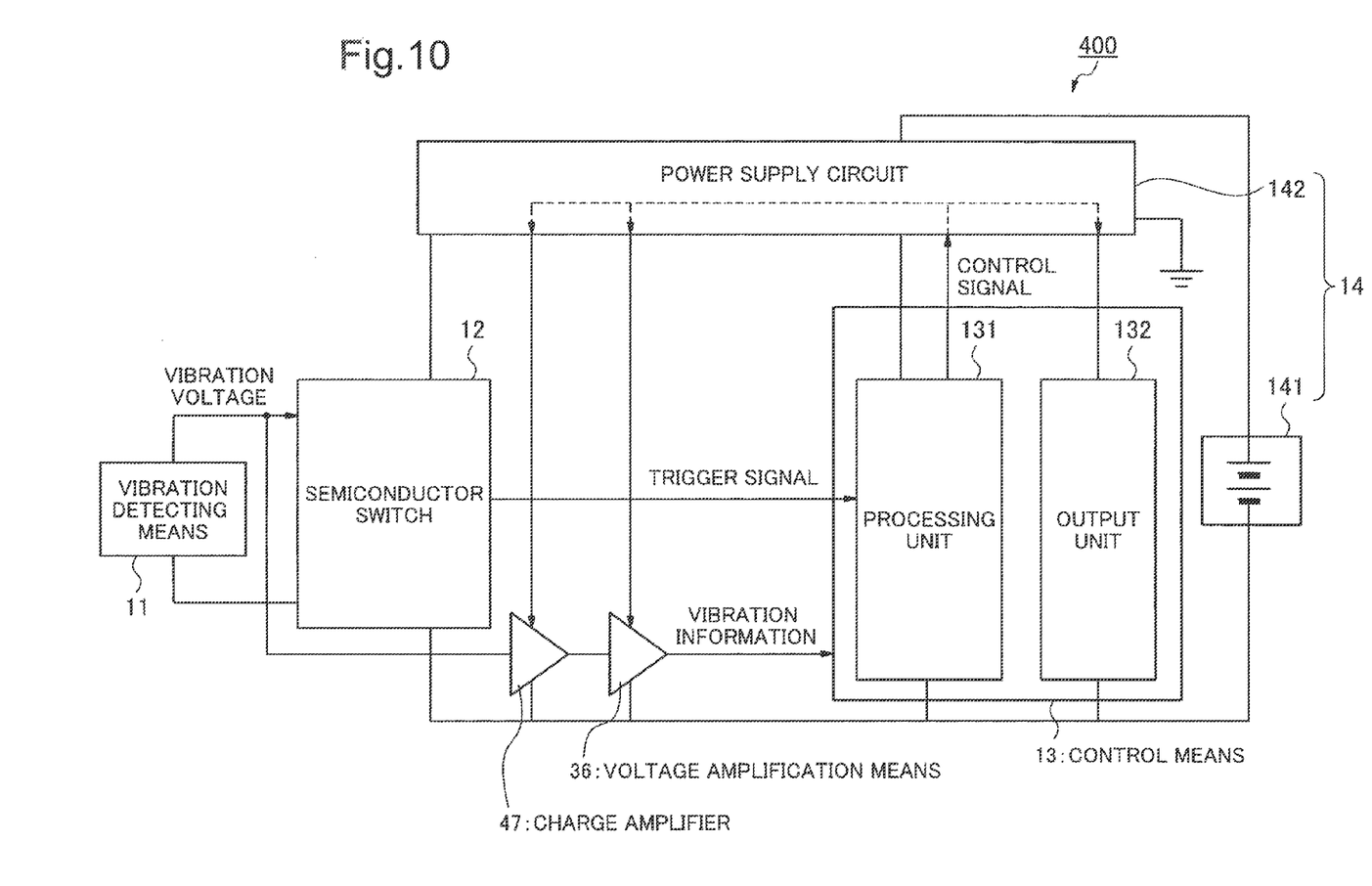
FIG. 10 is a schematic configuration diagram of an example of a vibration detecting apparatus of an exemplary embodiment 4.

A schematic configuration diagram of the vibration detecting apparatus of the exemplary embodiment 4 is shown in FIG. 10. The vibration detecting apparatus 400 of the present exemplary embodiment is the same as the vibration detecting apparatus 300 in FIG. 9, except that a charge amplifier 47 is disposed between the vibration detecting means 11 and the voltage amplification means 36. In FIG. 10, when a trigger signal is transmitted from the semiconductor switch 12 to the control means 13, the processing unit 131 switches from a standby state being a power saving mode to a wake-up state. At the same time as its waking up, the processing unit 131 transmits a control signal to the power supply circuit 142. In response to the control signal, the power supply circuit 142 supplies power to the charge amplifier 47, the voltage amplification means 36 and the output unit 132. A vibration voltage is transmitted to the voltage amplification means 36 via the charge amplifier 47. By thus adding the charge amplifier 47, it becomes possible to prevent that different vibration voltages are generated for the same vibration magnitude owing to change in capacitance between the vibration detecting means 11 and the voltage amplification means 36, which is, for example, change in the capacitance due to change in lengths of the cables connecting between the two means, deformation of the cables, temperature change or the like.

As has been described above, in the vibration detecting apparatus of the present exemplary embodiment 4, it is possible to prevent change of the vibration voltage due to change in capacitance between the vibration detecting means and the voltage amplification means, and accordingly to perform vibration detection more precisely, because the charge amplifier is further comprised.

Exemplary Embodiment 5

The vibration detecting apparatuses and the vibration detection methods of the present invention can be applied to, for example, a water-leakage detecting apparatus and a water-leakage detecting method. When applying any of them to water-leakage detection, an installation location for the vibration detecting means of the vibration detecting apparatus may be, for example, a water pipe such as an intake pipe, a conducting pipe, a supplying pipe and a feeding pipe, a manhole, a hydrant, a shutoff valve or the like. For example, when abnormality has occurred in a conducting pipe and abnormal vibration or abnormal sound due to water leakage is accordingly generated, vibration caused by the abnormal vibration or abnormal sound is detected at the vibration detecting means, and a vibration voltage is accordingly generated. In the semiconductor switch, a bias voltage generated by the voltage dividing means is superposed onto the vibration voltage, the voltage produced by the superposition is then detected, and a trigger signal is transmitted if the detected voltage is equal to or larger than a certain value. Then, the control means wakes up by the trigger signal. The control means having waked up starts performing a control process. As the control process, mentioned are analyses of the vibration waveform for identifying the abnormality in the conducting pipe, notification of the water leakage by an alarm and the like, for example. In a case of water leakage detection, voltage dividing resistors may be preferably used as the voltage dividing means in the semiconductor switch. Voltage dividing resistors may be preferably used because they have characteristics of small voltage fluctuation and small voltage change due to temperature change. As described above, the vibration detecting apparatuses and the vibration detecting methods of the present invention can be applied to a water-leakage detecting apparatus and a water-leakage detecting method.

Exemplary Embodiment 6

The vibration detecting apparatuses and the vibration detecting methods of the present invention can be applied to an intrusion detecting apparatus and an intrusion detecting method. When applying any of them to intrusion detection, an installation location for the vibration detecting apparatus may be, for example, a window frame, glass, a door, a floor surface, the ground surface or the like. Vibration caused by abnormal vibration or abnormal sound due to an intrusion action is detected by the vibration detecting means, and then the control means wakes up similarly to in the exemplary embodiment 5. The control means having waked up starts performing a control process. As the control process, mentioned are analyses of the vibration waveform for identifying the intrusion action, operation of a surveillance camera, activation of a security buzzer and the like, for example. As has been described above, the vibration detecting apparatuses and the vibration detecting methods of the present invention can be applied to an intrusion detecting apparatus and an intrusion detecting method.

Exemplary Embodiment 7

The vibration detecting apparatuses and the vibration detecting methods of the present invention can be applied to an abnormality detecting apparatus and an abnormality detecting method used in, for example, product inspection at a time of factory shipment. When applying any of them to abnormality detection at a time of product inspection, an installation location for the vibration detecting means of the vibration detecting apparatus may be, for example, on a conveyance means for conveying the products, such as a conveyer belt, or the like. For example, if a product has some abnormality, abnormal vibration or abnormal sound is generated, differently from normal products, when the product is conveyed. Vibration caused by the abnormal vibration or abnormal sound is detected by the vibration detecting means, and then the control means wakes up similarly to in the exemplary embodiment 5. The control means having waked up starts performing a control process. As the control process, mentioned are analyses of the vibration waveform for identifying the abnormality of the product, notification of the abnormality of the product by an alarm, and the like, for example. As has been described above, the vibration detecting apparatuses and the vibration detecting methods of the present invention can be applied to an abnormality detecting apparatus and an abnormality detecting method such as described above.

Exemplary Embodiment 8

The vibration detecting apparatuses and the vibration detecting methods of the present invention can be applied to a deterioration detecting apparatus and a deterioration detecting method used for, for example, a device such as a motor. When applying any of them to deterioration detection on a device, an installation location for the vibration detecting means of the vibration detecting apparatus may be, for example, on the housing of a motor or the like, on a stand with a motor or the like installed, thereon, and the like. For example, if deterioration occurs in the device such as a motor, abnormal vibration or abnormal sound due to the deterioration is generated. Vibration caused by the abnormal vibration or abnormal sound is detected by the vibration detecting means, and then the control means wakes up similarly to in the exemplary embodiment 5. The control means having waked up starts performing a control process. As the control process, mentioned are analyses of the vibration waveform for identifying the deterioration of the device, notification of deterioration of a structure by an alarm, and the like, for example. Thus, the vibration detecting apparatuses and the vibration detecting methods of the present invention can be applied to a deterioration detecting apparatus and a deterioration detecting method used for a device.

Although the present invention has been described above with reference to the exemplary embodiments, the present invention is not limited to the above-described exemplary embodiments. To the configurations and details of the present invention, various changes which can be understood by those skilled in the art may be made within the scope of the present invention.

This application is based upon and claims the benefit of priority from Japanese Patent Application No. 2012-137339, filed on Jun. 18, 2012, the disclosure of which is incorporated herein in its entirety by reference.

INDUSTRIAL APPLICABILITY

The vibration detecting apparatuses and the vibration detecting methods of the present invention can be applied to, for example, a security-related use such as intrusion detection, detection of water leakage or of destruction of a water pipe in a water pipeline system of a social infrastructure business, detection of deterioration of a structure such as a building or a house, detection of petroleum leakage or of destruction of a pipeline in a petroleum pipeline system, detection of gas leakage or of destruction of a pipeline in a gas pipeline system, detection of abnormality of general devices such as a motor, inspection at a time of product shipment, and the like, and thus, they can be applied unlimitedly to a wide variety of uses.

REFERENCE SIGNS LIST

100, 300, 400 vibration detecting apparatus
11 vibration detecting means
12, 12A, 22, 22A semiconductor switch
13 control means
131 processing unit
132 output unit (transmission/reception unit)
14 power supply means
141 power supply
142 power supply circuit
25, 25A half-wave voltage doubler rectifying circuit (voltage doubling circuit)
36 voltage amplification means
47 charge-voltage conversion means (charge amplifier)

The invention claimed is:

1. A vibration detecting apparatus; comprising:
a vibration detector;
a semiconductor switch;
a controller; and
a power supply,
wherein:
the semiconductor switch and the controller are connected with the power supply,
the vibration detector detects vibration and generates a vibration voltage,
the semiconductor switch comprises a voltage divider for generating a bias voltage inside,
the semiconductor switch is a switch which detects a voltage consisting of the vibration voltage and of a bias voltage superposed on the vibration voltage, and conducts current when the detected voltage is equal to or larger than a certain value,
the controller wakes up with the current conducted by the semiconductor switch as a trigger signal,
the voltage divider includes voltage dividing resistors,
the semiconductor switch comprises a channel FET and a bipolar transistor,
the voltage dividing resistors comprise a first and a second resistors,
the first and the second resistors each comprise a first and a second terminals,
the vibration detector comprises a first and a second terminals,
the first terminal of the first resistor is electrically connected to the power supply,
the second terminal of the first resistor is electrically connected to the first terminal of the second resistor and to the second terminal of the vibration detector,
the second terminal of the second resistor is grounded,
the first terminal of the vibration detector is electrically connected to the gate of the channel FET,
the source of the channel FET is grounded,
the drain of the channel FET is electrically connected to the base of the bipolar transistor,
the emitter of the bipolar transistor is electrically connected to the power supply, and
the collector of the bipolar transistor is electrically connected to the controller.

2. The vibration detecting apparatus according to claim 1, wherein the semiconductor switch comprises a voltage doubling circuit inside.

3. The vibration detecting apparatus according to claim 2, wherein the voltage divider includes voltage dividing resistors.

4. The vibration detecting apparatus according to claim 2, wherein the voltage divider comprises a voltage dividing capacitor.

5. The vibration detecting apparatus according to claim 1, wherein the voltage divider comprises a voltage dividing capacitor.

6. The vibration detecting apparatus according to claim 5, wherein:
the voltage dividing capacitor comprises a first and a second terminals,
the first terminal of the voltage dividing capacitor is electrically connected to the first terminal of the second resistor, and
the second terminal of the voltage dividing capacitor is grounded.

7. The vibration detecting apparatus according to claim 1, further comprising:
a voltage amplifier,
wherein the voltage amplifier amplifies a vibration voltage generated by the vibration detector, and transmits information on the amplified vibration voltage to the controller.

8. The vibration detecting apparatus according to claim 1, wherein the vibration detector is a piezoelectric sensor.

9. The vibration detecting apparatus according to claim 8, further comprising:
a charge-voltage convertor,
wherein the charge-voltage convertor is disposed between the vibration detector and the voltage amplifier.

10. An abnormality detecting apparatus, comprising a vibration detecting apparatus according to claim 1, and detecting abnormality through vibration detection by the use of the vibration detector.

11. An intrusion detecting apparatus, comprising a vibration detecting apparatus according to claim 1, and detecting intrusion through vibration detection by the use of the vibration detector.

12. A leakage detecting apparatus, comprising a vibration detecting apparatus according to claim 1, and detecting leakage through vibration detection by the use of the vibration detector.

13. A vibration detecting apparatus, comprising:
a vibration detector;
a semiconductor switch; and
a controller; and
a power supply,
wherein:
the semiconductor switch and the controller are connected with the power supply,
the vibration detector detects vibration and generates a vibration voltage,
the semiconductor switch comprises a voltage divider for generating a bias voltage inside,
the semiconductor switch is a switch which detects a voltage consisting of the vibration voltage and of a bias voltage superposed on the vibration voltage, and conducts current when the detected voltage is equal to or larger than a certain value,
the controller wakes up with the current conducted by the semiconductor switch as a trigger signal,
the voltage divider includes voltage dividing resistors,
the semiconductor switch comprises a channel FET and a bipolar transistor,
the voltage dividing resistors comprise a first and a second resistors,
the first and the second resistors each comprise a first and a second terminals,
the vibration detector comprises a first and a second terminals,
the first terminal of the first resistor is electrically connected to the power supply,
the second terminal of the first resistor is electrically connected to the first terminal of the second resistor and to the first terminal of the vibration detector,
the second terminal of the second resistor is grounded,
the second terminal of the vibration detector is electrically connected to the gate of the channel FET,
the drain of the channel FET is electrically connected to the power supply,
the source of the channel FET is electrically connected to the base of the bipolar transistor,
the emitter of the bipolar transistor is electrically connected to the controller, and
the collector of the bipolar transistor is electrically connected to the power supply.

14. The vibration detecting apparatus according to claim 1, wherein the voltage divider comprises a voltage dividing capacitor.

15. The vibration detecting apparatus according to claim 14, wherein:
the voltage dividing capacitor comprises a first and a second terminals,
the first terminal of the voltage dividing capacitor is electrically connected to the power supply, and
the second terminal of the voltage dividing capacitor is electrically connected to the second terminal of the first resistor.

* * * * *